United States Patent
Hashimoto et al.

(10) Patent No.: US 11,192,555 B2
(45) Date of Patent: Dec. 7, 2021

(54) VEHICLE CONTROLLER

(71) Applicant: Toyota Jidosha Kabushiki Kaisha, Toyota (JP)

(72) Inventors: Ryo Hashimoto, Tokyo (JP); Yoshinori Watanabe, Isehara (JP); Masaaki Yamaoka, Tokyo (JP); Kenichiro Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 16/682,287

(22) Filed: Nov. 13, 2019

(65) Prior Publication Data

US 2020/0180641 A1 Jun. 11, 2020

(30) Foreign Application Priority Data

Dec. 10, 2018 (JP) .............................. JP2018-230856

(51) Int. Cl.
*B60W 30/18* (2012.01)
*B60W 40/105* (2012.01)
*G06K 9/00* (2006.01)

(52) U.S. Cl.
CPC .... *B60W 30/18163* (2013.01); *B60W 40/105* (2013.01); *G06K 9/00798* (2013.01); *G06K 9/00825* (2013.01); *B60W 2554/801* (2020.02); *B60W 2554/804* (2020.02)

(58) Field of Classification Search
CPC ....... B60W 2552/00; B60W 2554/801; B60W 2554/804; B60W 2555/60; B60W 2556/40; B60W 30/14; B60W 30/18163; B60W 40/105; G06K 9/00798; G06K 9/00825
See application file for complete search history.

(56) References Cited

U.S. PATENT DOCUMENTS

| | | | |
|---|---|---|---|
| 9,147,353 B1 * | 9/2015 | Slusar | G06Q 40/08 |
| 10,688,997 B2 * | 6/2020 | Habu | B60W 50/0097 |
| 10,691,958 B1 * | 6/2020 | Fink | G06K 9/6267 |
| 10,773,732 B1 * | 9/2020 | Alexander | G05D 1/0088 |

(Continued)

FOREIGN PATENT DOCUMENTS

| | | |
|---|---|---|
| DE | 102007008517 A1 | 8/2008 |
| JP | 2006-176069 A | 7/2006 |

(Continued)

*Primary Examiner* — Babar Sarwar
(74) *Attorney, Agent, or Firm* — Dinsmore & Shohl LLP

(57) ABSTRACT

A vehicle controller includes: a determination unit configured to determine a preparatory speed of a vehicle in a merging lane based on a relative speed between a first main lane vehicle traveling on a main lane and the vehicle, the first main lane vehicle being detected by a front sensor of the vehicle; a preparation unit configured to adjust speed of the vehicle such that the speed of the vehicle coincides with the preparatory speed; and a merging control unit configured to merge the vehicle into the main lane from the merging lane based on at least a detection result of a side sensor of the vehicle and the speed of the vehicle, when the vehicle is in a situation where the main lane vehicle is recognizable based on the detection result of the side sensor, after the preparation unit starts speed adjustment of the vehicle.

17 Claims, 11 Drawing Sheets

(56) References Cited

U.S. PATENT DOCUMENTS

| | | | |
|---|---|---|---|
| 2007/0142995 A1* | 6/2007 | Wotlermann | B60W 30/16 701/96 |
| 2007/0150196 A1* | 6/2007 | Grimm | G06K 9/00825 701/301 |
| 2012/0083964 A1* | 4/2012 | Montemerlo | G06T 7/74 701/26 |
| 2015/0166062 A1* | 6/2015 | Johnson | B60W 10/20 701/41 |
| 2015/0312327 A1* | 10/2015 | Fowe | B60R 1/00 701/23 |
| 2017/0203764 A1* | 7/2017 | Fujiki | B60W 10/20 |
| 2017/0369062 A1* | 12/2017 | Saigusa | B60W 30/16 |
| 2018/0032082 A1* | 2/2018 | Shalev-Shwartz | G06N 7/005 |
| 2018/0037227 A1* | 2/2018 | D'sa | B60W 50/045 |
| 2018/0194363 A1* | 7/2018 | Sugiura | G01C 21/3602 |
| 2018/0194364 A1* | 7/2018 | Asakura | B60W 50/0205 |
| 2018/0284266 A1* | 10/2018 | Talamonti | G05D 1/0214 |
| 2018/0339708 A1* | 11/2018 | Geller | B60W 50/0097 |
| 2019/0064824 A1* | 2/2019 | Nix | G05D 1/0088 |
| 2019/0138024 A1* | 5/2019 | Liang | G06K 9/6273 |
| 2019/0139415 A1* | 5/2019 | Sakaguchi | B60W 30/10 |
| 2019/0299991 A1* | 10/2019 | Horii | B60W 60/00274 |
| 2019/0317506 A1* | 10/2019 | Ishioka | G05D 1/0088 |
| 2019/0322287 A1* | 10/2019 | Escrig-Monferrer | B60W 30/18109 |
| 2019/0337530 A1* | 11/2019 | Hiramatsu | B60W 50/10 |
| 2020/0079377 A1* | 3/2020 | Yashiro | B60W 10/04 |
| 2021/0146937 A1* | 5/2021 | Sugiura | B60W 50/14 |

FOREIGN PATENT DOCUMENTS

| | | |
|---|---|---|
| JP | 2006-323686 A | 11/2006 |
| JP | 2008-222062 A | 9/2008 |
| JP | 2017-102739 A | 6/2017 |
| JP | 2018-052326 A | 4/2018 |
| JP | 2018052326 A * | 4/2018 |
| JP | 2018-106354 A | 7/2018 |

* cited by examiner

VEHICLE CONTROLLER

CROSS-REFERENCE TO RELATED APPLICATIONS

This application claims priority to Japanese Patent Application No. 2018-230856 filed on Dec. 10, 2018, which is incorporated herein by reference in its entirety including the specification, drawings and abstract.

BACKGROUND

1. Technical Field

The present disclosure relates to a vehicle controller.

2. Description of Related Art

Japanese Patent Application Publication No. 2008-222062 discloses a vehicle controller that merges a vehicle traveling on a merging lane into a main lane. The vehicle controller acquires the location and overall length of a main lane vehicle traveling on the main lane based on side sensor information, and merges the vehicle traveling on the merging lane into the main lane based on the acquired information on the main lane vehicle.

SUMMARY

There are cases where a shielding object that disturbs a detection function of the side sensor is present between the merging lane and the main lane. In these cases, the side sensor can acquire the information on the main lane vehicle only in a section immediately before merging where the shielding object is interrupted. Since merging control is started after the vehicle controller starts to acquire the side sensor information, a large speed change may be necessary for merging, or the merging may be inoperable.

The present disclosure provides a vehicle controller capable of performing an appropriate preparation for merging.

A vehicle controller according to a first aspect of the present disclosure is configured to control travel of a vehicle traveling on a merging lane that merges with a main lane. The vehicle controller includes: a situation determination unit configured to determine whether the vehicle is in a situation where a main lane vehicle traveling on the main lane is recognizable based on a detection result of a side sensor mounted on the vehicle; a determination unit configured to determine a preparatory speed of the vehicle in the merging lane based on a relative speed between a first main lane vehicle traveling on the main lane and the vehicle, the first main lane vehicle being detected by a front sensor mounted on the vehicle; a preparation unit configured to adjust speed of the vehicle such that the speed of the vehicle coincides with the preparatory speed; and a merging control unit configured to merge the vehicle into the main lane from the merging lane based on at least the detection result of the side sensor and the speed of the vehicle, when the situation determination unit determines that the vehicle is in the situation where the main lane vehicle is recognizable based on the detection result of the side sensor, after the preparation unit starts speed adjustment of the vehicle.

According to the above aspect, even when the main lane vehicle is not recognizable based on the detection result of the side sensor, the preparatory speed of the vehicle in the merging lane is determined based on the relative speed between the first main lane vehicle traveling on the main lane and the vehicle, the first main lane vehicle being detected by the front sensor. The speed of the vehicle traveling on the merging lane is adjusted to be the preparatory speed. When the main lane vehicle is recognizable based on the detection result of the side sensor after the start of speed adjustment, the vehicle merges into the main lane based on at least the detection result of the side sensor, and the speed of the vehicle. Thus, even when the main lane vehicle is not recognizable based on the detection result of the side sensor, as in the case where a shielding object that disturbs the detection function of the side sensor is present between the merging lane and the main lane, the vehicle controller can adjust the speed of the vehicle based on the relative speed with respect to the first main lane vehicle even before the detection function of the side sensor becomes effective. Accordingly, the vehicle controller can perform an appropriate preparation for merging.

In the above aspect, the determination unit may be configured to determine the preparatory speed when the situation determination unit determines that the vehicle is not in the situation where the main lane vehicle is recognizable based on the detection result of the side sensor.

When the main lane vehicle is not recognizable based on the detection result of the side sensor, the vehicle controller determines the preparatory speed of the vehicle in the merging lane based on the relative speed between the first main lane vehicle traveling on the main lane and the vehicle, the first main lane vehicle being detected by the front sensor. The speed of the vehicle traveling on the merging lane is adjusted to be the preparatory speed. When the main lane vehicle is recognizable based on the detection result of the side sensor after the start of speed adjustment, the vehicle merges into the main lane based on at least the detection result of the side sensor, and the speed of the vehicle. Thus, when the main lane vehicle is not recognizable based on the detection result of the side sensor, as in the case where a shielding object that disturbs the detection function of the side sensor is present between the merging lane and the main lane, the vehicle controller can adjust the speed of the vehicle based on the relative speed with respect to the first main lane vehicle even before the detection function of the side sensor becomes effective. Accordingly, the vehicle controller can perform an appropriate preparation for merging.

In the above aspect, the merging control unit may be configured to merge the vehicle into the main lane from the merging lane based on the speed of the vehicle and on a relative speed and a relative position between a second main lane vehicle traveling on the main lane and the vehicle and, the second main lane vehicle being detected by the side sensor. The vehicle controller can merge the vehicle into the main lane based on the relative speed and relative position between the second main lane vehicle and the vehicle and on the speed of the vehicle.

In the above aspect, the merging control unit may be configured to: determine a merging position in the main lane; adjust the speed of the vehicle such that a longitudinal position of the vehicle is beside the merging position, the longitudinal position being a position in an extending direction of the main lane; and merge the vehicle into the main lane from the merging lane by regulating steering of the vehicle after adjustment of the speed of the vehicle is completed. In gradual merging control where the speed of the vehicle is adjusted and then steering is performed, since the speed of the vehicle is adjusted to be the preparatory speed before merging control, the speed of the vehicle can be adjusted such that the longitudinal position of the vehicle is beside the merging position in a short time.

In the above aspect, the determination unit may be configured to determine the preparatory speed based on the relative speed between the first main lane vehicle and the vehicle and on an inter-vehicle distance between the first main lane vehicle and the main lane vehicle in a periphery of the first main lane vehicle. According to the configuration, the vehicle controller can determine the preparatory speed in accordance with the inter-vehicle distance in the main lane.

In the above aspect, the determination unit may be configured to determine the preparatory speed based on the relative speed between the first main lane vehicle and the vehicle and on a density of a plurality of the main lane vehicles. According to the configuration, the vehicle controller can determine the preparatory speed in accordance with the vehicle density in the main lane.

In the above aspect, the vehicle controller may further include an acquisition unit configured to acquire a length of the merging lane based on map information. The determination unit may be configured to determine the preparatory speed in accordance with the length of the merging lane acquired by the acquisition unit. With the configuration, the vehicle controller can change the preparatory speed in accordance with the length of the merging lane.

In the above aspect, the vehicle controller may further include a recognition unit configured to recognize a preceding vehicle traveling on the merging lane. The determination unit may be configured to, when the recognition unit recognizes the preceding vehicle, determine the preparatory speed such that an inter-vehicle distance between the preceding vehicle and the vehicle coincides with the inter-vehicle distance between the first main lane vehicle and the main lane vehicle in a periphery of the first main lane vehicle detected by the front sensor. With the configuration, the inter-vehicle distance in the main lane is adjusted to be the inter-vehicle distance in the merging lane. As a result, a merging success rate can be increased.

In the above aspect, the vehicle control unit may further include a recognition unit configured to recognize a preceding vehicle traveling on the merging lane. The preparation unit may be configured to, when the recognition unit recognizes the preceding vehicle, control travel of the vehicle such that an inter-vehicle distance between the vehicle and the preceding vehicle becomes a prescribed inter-vehicle distance or more, and then control travel of the vehicle such that the speed of the vehicle coincides with the preparatory speed. With the configuration, before the speed of the vehicle is adjusted to be the preparatory speed, the distance between the vehicle and the preceding vehicle becomes the prescribed inter-vehicle distance or more. As a result, it becomes possible to enhance the probability that the speed of the vehicle is adjusted to the preparatory speed without causing a contact with the preceding vehicle.

In the above aspect, the preparatory speed may be a speed suitable for merging of the vehicle into the main lane from the merging lane Various aspects of the present disclosure makes it possible to perform an appropriate preparation for merging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
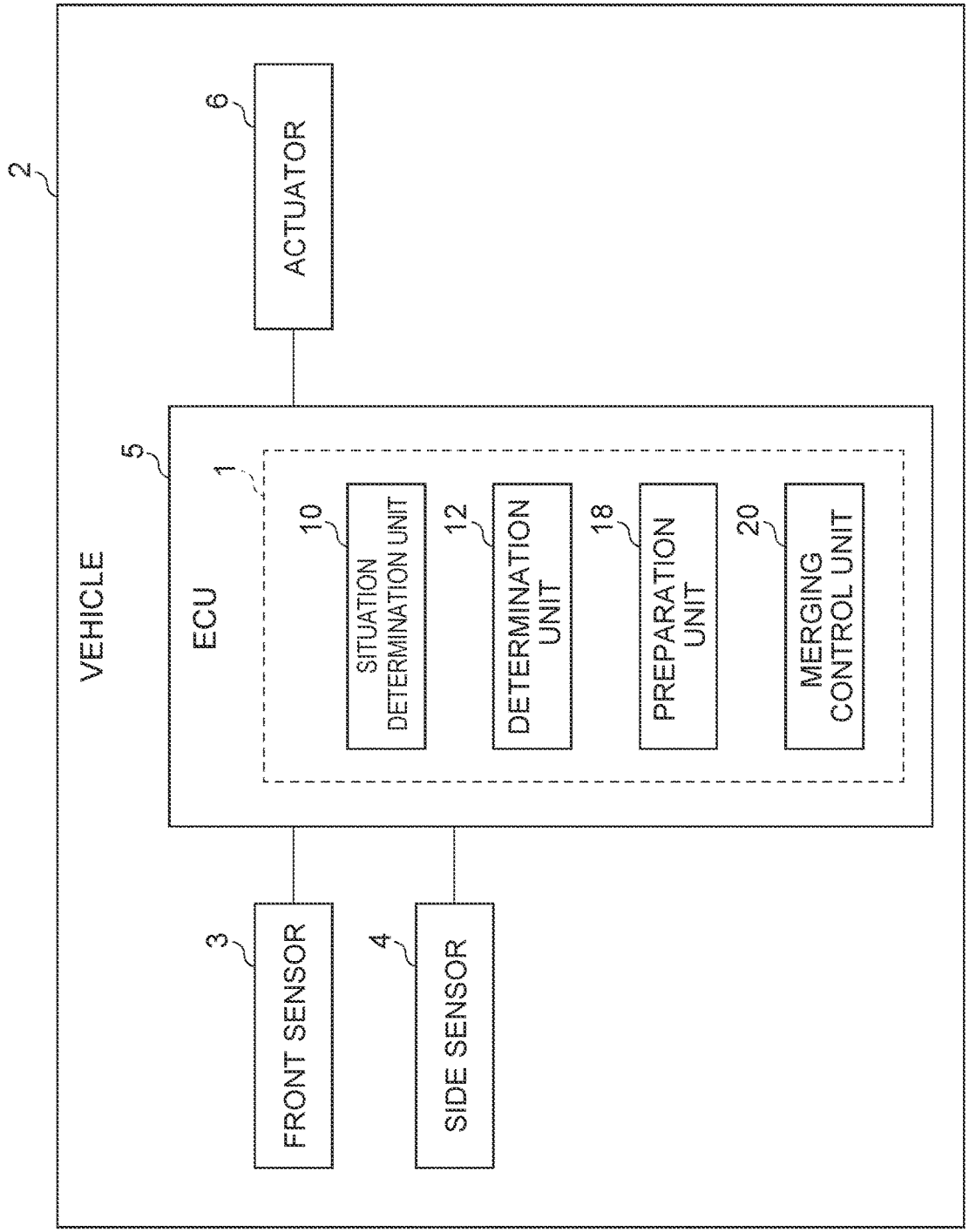
FIG. 1 is a block diagram showing an example of a vehicle including a vehicle controller according to a first embodiment.

Hereinafter, exemplary embodiments of the present disclosure will be described with reference to the drawings. In the following description, like or corresponding component members are designated by like reference numerals to omit redundant explanation.

First Embodiment

Configuration of Vehicle Controller

FIG. 1 is a block diagram showing an example of a vehicle including a vehicle controller according to a first embodiment. As shown in FIG. 1, a vehicle controller 1 is mounted on a vehicle 2, such as a passenger car, to control travel of the vehicle 2. The vehicle controller 1 controls travel of the vehicle 2 by autonomous driving mode. The autonomous driving is the vehicle control to cause autonomous travel of the vehicle 2 toward a preset destination without driving operation of the driver. In a more specific example, the vehicle controller 1 controls travel of the vehicle 2 traveling on a merging lane that merges with a main lane. The main lane is a merging destination road. The vehicle controller 1 performs speed control and steering control of the vehicle 2 to merge the vehicle 2 into the main lane from the merging lane. The vehicle 2 includes a front sensor 3, a side sensor 4, an ECU 5, and an actuator 6.

The front sensor 3 is a detector that detects an external situation in front of the vehicle 2. The side sensor 4 is a detector that detects an external situation on the side of the vehicle 2. The front sensor 3 and the side sensor 4 each include at least one of a camera and a radar sensor.

The camera is an imaging device that images an external situation of the vehicle 2. The camera acquires imaging information regarding the external situation of the vehicle 2. The radar sensor is a detector that detects objects outside the vehicle 2 with use of electric waves (such as millimeter waves) or light. Examples of the radar sensor include a millimeter-wave radar or a laser imaging detection and ranging (LIDAR). The radar sensor detects objects by transmitting an electric wave or light and receiving the electric wave or light reflected upon the objects. When a camera is used as the front sensor 3, the camera is placed in the vehicle 2 such that an area in front of the vehicle 2 is within an image viewing angle. When the radar sensor is used as the front sensor 3, the radar sensor is placed in the vehicle 2 such that a transmission range of the electric wave or light is in front of the vehicle 2. When a camera is used as the side sensor 4, the camera is placed in the vehicle 2 such that the side of the vehicle 2 is within the image viewing angle. When a radar sensor is used as the side sensor 4, the radar sensor is placed in the vehicle 2 such that the transmission range of the electric wave or light is on the side of the vehicle 2.

The ECU 5 is an electronic control unit including a central processing unit (CPU), a read only memory (ROM), a random access memory (RAM), and a controller area network (CAN) communication circuit. The ECU 5 is connected to a network that communicates using, for example, the CAN communication circuit so as to be communicably connected with the front sensor 3, the side sensor 4, and the actuator 6. For example, in response to signals output from the CPU, the ECU 5 operates the CAN communication circuit to allow data input and output, store the data in the RAM, load programs stored in the ROM or the like onto the RAM, and execute the programs loaded onto the RAM. Thus, the functions of the component members of the ECU 5 described later are implemented. The ECU 5 may be configured with a plurality of electronic control units.

The actuator 6 is a device that executes travel control of the vehicle 2. The actuator 6 includes at least an engine actuator, a brake actuator, and a steering actuator. The engine actuator changes the amount of air supplied to the engine (for example, changes a throttle opening angle) in response to a control signal from the ECU 5 so as to control drive power of the vehicle 2. The engine actuator controls drive power of a motor as a driving power source, when the vehicle 2 is a hybrid vehicle or an electric vehicle.

The brake actuator controls a brake system in response to a control signal from the ECU 5 so as to control braking force applied to the wheels of the vehicle 2. As the brake system, a hydraulic brake system can be used, for example. The brake actuator may control both a hydraulic brake system and a regeneration brake system, when the vehicle 2 includes the regeneration brake system. The steering actuator controls driving of an assist motor that controls a steering torque in an electric power steering system, in response to a control signal from the ECU 5. Thus, the steering actuator controls the steering torque of the vehicle 2.

Now, the details of the ECU 5 will be described. The ECU 5 operates the actuator 6 to allow autonomous travel of the vehicle 2 based on the detection result of an unshown sensor that detects the location and travel state of the vehicle 2, or the detection result of the front sensor 3 and the side sensor 4.

The ECU 5 includes a situation determination unit 10, a determination unit 12, a preparation unit 18, and a merging control unit 20 as functional component members. The vehicle controller 1 is configured to include the situation determination unit 10, the determination unit 12, the preparation unit 18, and the merging control unit 20.

The situation determination unit 10 determines whether or not a main lane vehicle traveling on a main lane is recognizable based on the detection result of the side sensor 4. The situation determination unit 10 determines, based on the detection result of the side sensor 4, whether or not the main lane vehicle is recognizable with use of the side sensor 4. When the side sensor 4 is a camera, and the main lane can be imaged, the main lane vehicle is recognizable based on the image of the main lane. On the contrary, when the main lane cannot be imaged, the main lane vehicle is not recognizable based on the image of the main lane. For example, when a shielding object is present between the merging lane and the main lane, the shielding object is imaged, and therefore an image of the main lane is not available. Accordingly, the situation determination unit 10 determines whether or not the main lane vehicle is recognizable, based on whether or not the main lane can be imaged. When the side sensor 4 is a radar sensor, and the radar sensor can receive an electric wave or light reflected upon road paints, poles, or the like, in the main lane, the main lane vehicle is recognizable. Contrary to this, when an electric wave or light does not reach the road paints, poles, or the like, in the main lane, or when the radar sensor fails to receive the electric wave or light reflected upon the road paints, poles, or the like, in the main lane, the main lane vehicle is not recognizable. For example, when a shielding object is present between the merging lane and the main lane, an electric wave or light is blocked by the shielding object, and the radar sensor receives only the information on the shielding object. Accordingly, the situation determination unit 10 determines whether or not the main lane vehicle is recognizable, based on whether or the radar sensor receives the road paints or poles in the main lane.

Figure 2:
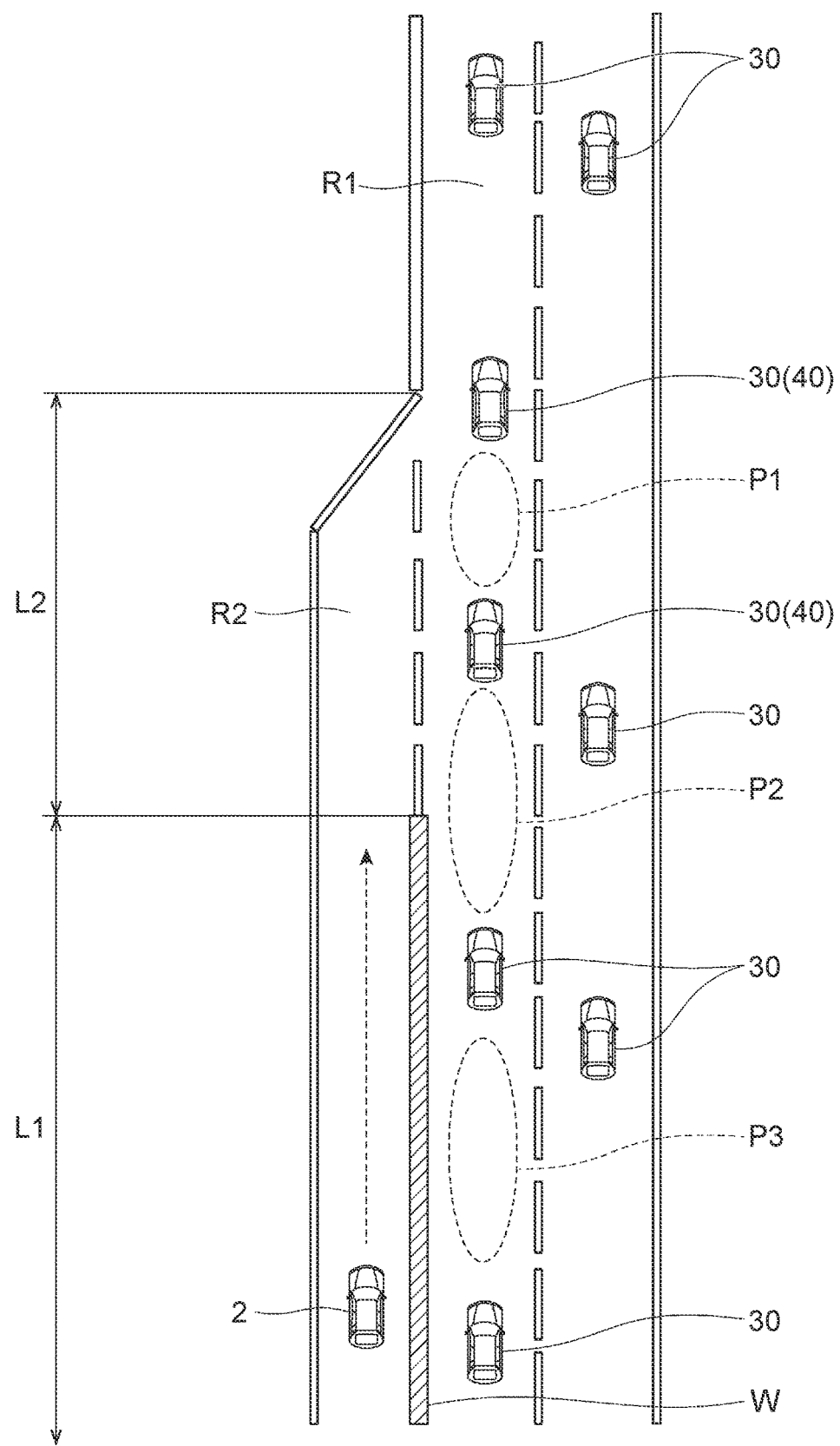
FIG. 2 shows an example of a merging scene.
Figure 3:
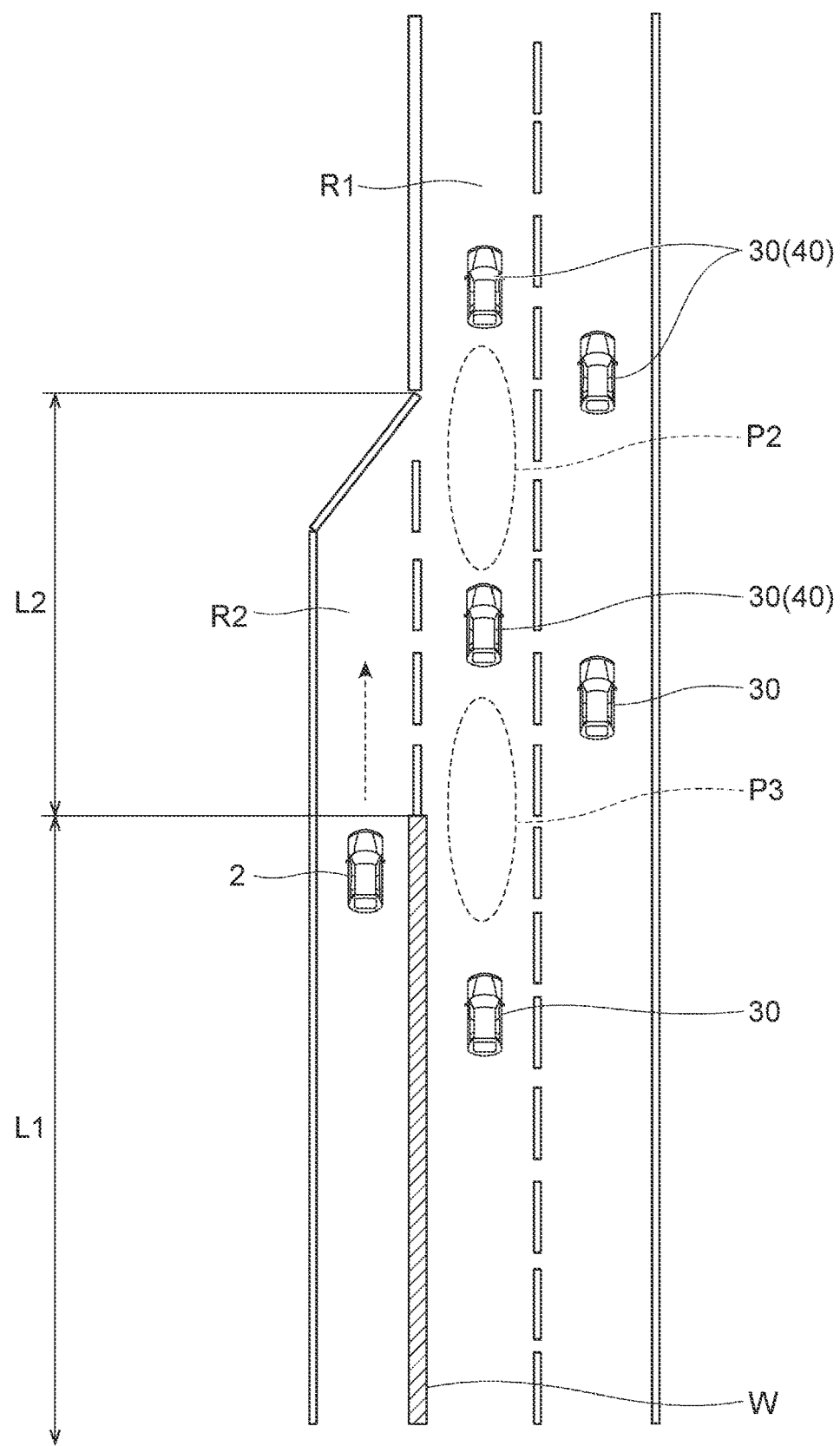
FIG. 3 shows an example of the merging scene.
Figure 4:
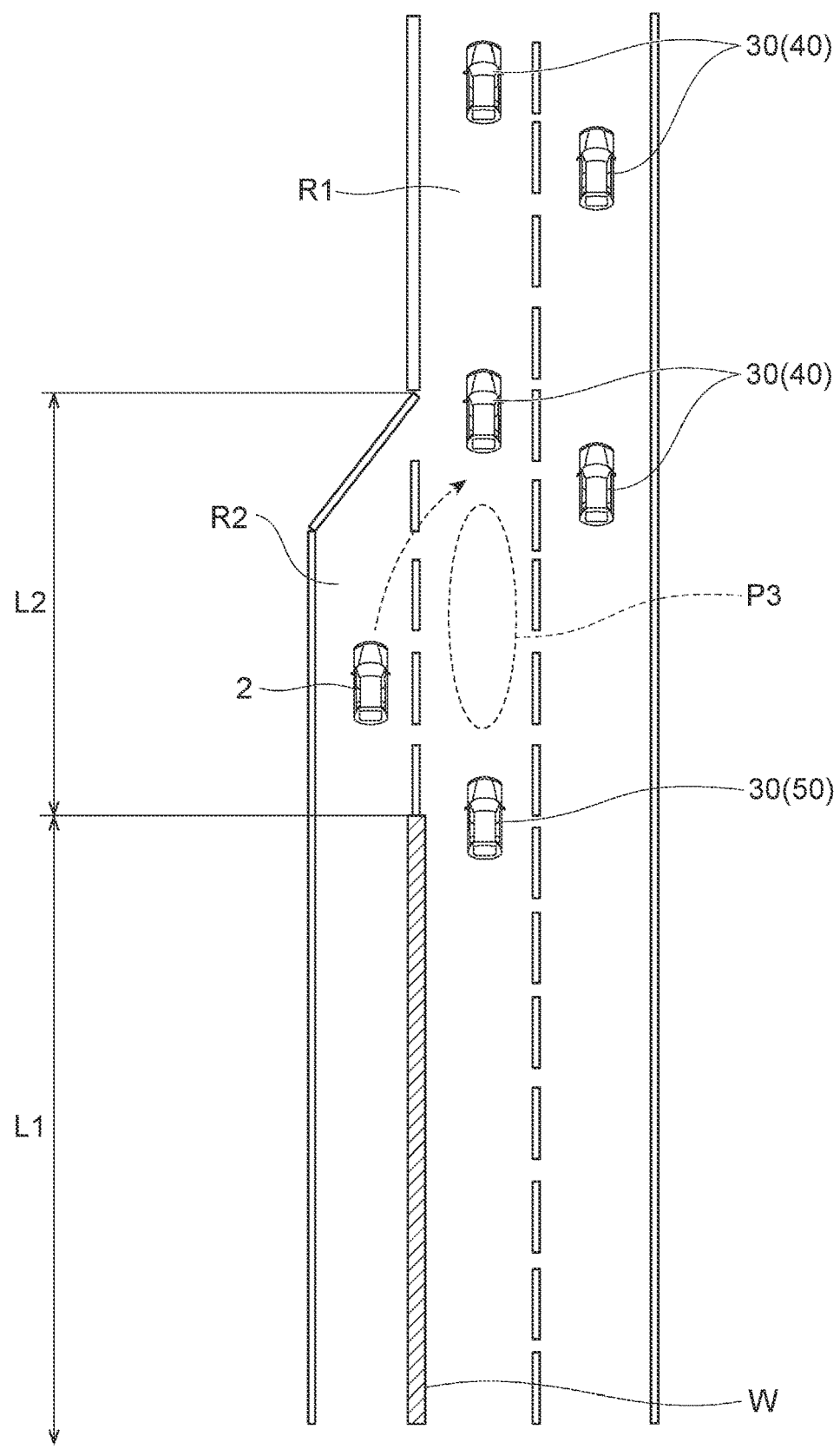
FIG. 4 shows an example of the merging scene.

FIGS. 2 to 4 show examples of a merging scene. FIGS. 2 to 4 show the same merging scene in time series. As shown in FIG. 2, a merging lane R2 is connected to a main lane R1. The vehicles traveling on the main lane R1 are main lane vehicles 30. A vehicle 2 travels on the merging lane R2 (see FIGS. 2 to 3), and merges into the main lane R1 at a merging point that is a connection point of the main lane R1 and the merging lane R2 (see FIG. 4). Present between the main lane R1 and the merging lane R2 is a wall W that is a shielding object. In the merging scene shown in FIGS. 2 to 4, while the vehicle 2 travels in a first section L that is a section where the wall W is present, the wall W is detected as a detection result of the side sensor 4. Accordingly, while the vehicle 2 travels in the first section L1, the situation determination unit 10 determines that any main lane vehicle 30 is not recognizable based on the detection result of the side sensor 4. The situation determination unit 10 monitors the detection result of the side sensor 4, and repeatedly executes the determination in a prescribed period.

When the situation determination unit 10 determines that any main lane vehicle 30 is not recognizable based on the detection result of the side sensor, the determination unit 12 determines a preparatory speed of the vehicle 2 in the merging lane R2. In the merging scene shown in FIG. 2, any main lane vehicle 30 is not detectable with the side sensor 4, though the main lane vehicle 30 in the vicinity of the merging point is detectable with the front sensor 3. Hereinafter, the main lane vehicle 30 detected with the front sensor 3 is referred to as a first main lane vehicle 40. The determination unit 12 determines the preparatory speed of the vehicle 2 in the merging lane R2, based on a relative speed between the first main lane vehicle 40 traveling on the main lane R1 and the vehicle 2, the first main lane vehicle 40 being detected with the front sensor 3. The preparatory speed is a target speed of the vehicle 2 before the vehicle controller 1 starts the merging control using at least the side sensor 4. In the merging scene shown in FIG. 2, the preparatory speed is determined as a target speed of the vehicle 2 while the vehicle 2 travels in the first section L1.

The determination unit 12 can determine the preparatory speed by various methods. For example, the determination unit 12 sets a suitable speed for merging as the preparatory speed, based on the relative speed between the first main lane vehicle 40 and the vehicle 2. The suitable speed for merging may be defined as a speed that shortens a distance necessary for speed adjustment at the time of merging control. As the distance necessary for the speed adjustment at the time of merging control is shorter, it signifies that the vehicle 2 can travel in the second section L2 easier, and therefore the probability of smooth merging of the vehicle 2 is increased more.

The determination unit 12 can determine the speed where the relative speed between the first main lane vehicle 40 and the vehicle 2 becomes 0 km/h, or the speed where the relative speed becomes a threshold speed or lower as the preparatory speed, for example. The determination unit 12 may determine the preparatory speed to be lower by a prescribed speed than the speed of the first main lane vehicle 40. For example, the determination unit 12 determines the preparatory speed to be 0.7 time to 0.9 time the speed of the first main lane vehicle 40, based on the relative speed between the first main lane vehicle 40 and the vehicle 2. Thus, the determination unit 12 can determine the preparatory speed based on the relative speed between the first main lane vehicle 40 and the vehicle 2 with use of a predetermined coefficient.

The determination unit 12 determines the preparatory speed with use of the speed of the first main lane vehicle 40 and the predetermined coefficient in the above example. However, the determined preparatory speed is a suitable speed for merging only in the case where the vehicle 2 and the main lane vehicle 30 do not run parallel at the time when the vehicle 2 reaches the end of the first section L1, and enters the second section L2 where the wall W is no longer present. Here, the term "running parallel" refers to the situation where the vehicles are positioned side by side. In short, when the vehicle 2 and the main lane vehicle 30 run parallel to each other in the merging scene shown in FIG. 4, the vehicle 2 needs to adjust the speed to generate a difference in relative speed from the main lane vehicle 30 at the time of traveling in the second section L2. Accordingly, when the preparatory speed is set such that the relative speed becomes a threshold speed or more in the scene of parallel running, the distance necessary for speed adjustment at the time of merging control can be shortened. This makes it possible to increase the probability of smooth merging.

As is clear from the above consideration, when the determination unit 12 determines the preparatory speed using the predetermined coefficient, an effect of shortening the distance necessary for speed adjustment at the time of merging control is demonstrated in the non-parallel running scene where the vehicle 2 and the main lane vehicle 30 do not run parallel. In short, whether the preparatory speed is suitable or unsuitable for merging can be determined only after the vehicle 2 reaches the end of the first section L1, enters the second section, and acquires the detection result of the side sensor 4. Accordingly, in order to increase the likelihood that the preparatory speed becomes the speed suitable for merging, the determination unit 12 can use probability.

Figure 5:
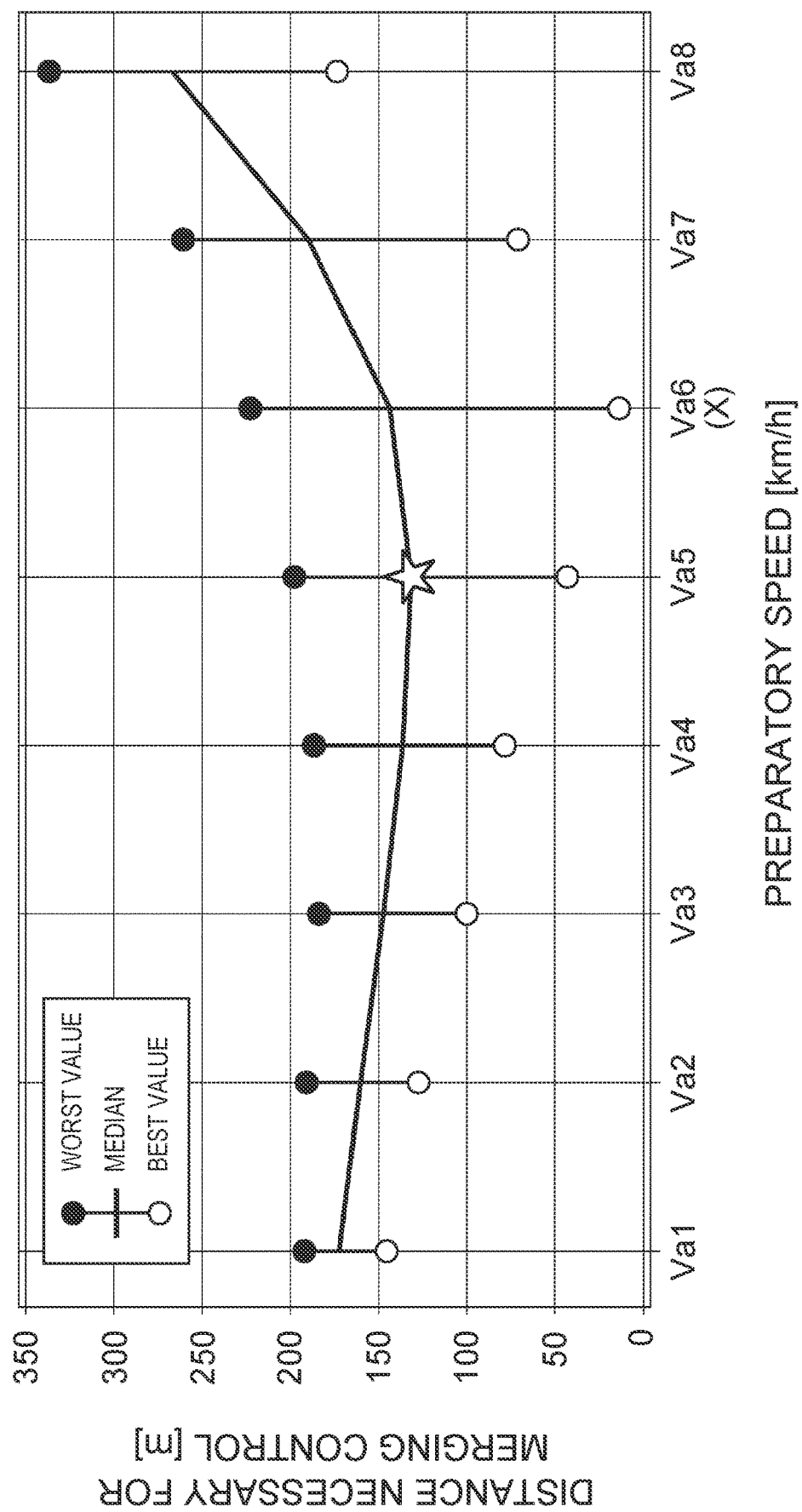
FIG. 5 is a graph showing an example of the relationship between a distance and a preparatory speed necessary for merging control.

FIG. 5 is a graph showing an example of the relationship between the distance necessary for merging control and the preparatory speed in the scene where the speed of the main lane vehicle is X [km/h]. A horizontal axis represents the preparatory speed and a vertical axis represents the distance necessary for merging control. In the scene where the speed of the main lane vehicles is X [km/h], the distance necessary for speed adjustment at the time of merging control is calculated in advance for each preparatory speed by probability distribution. The speed X [km/h] is assumed to be identical to a speed Va6 in the drawing. For example, in the probability distribution graph, when the preparatory speed is Va1 [km/h], the distance necessary for the speed adjustment at the time of merging control is in the range of 148 m to 195 m with a median being 175 m. It can be said that when the distance necessary for the speed adjustment at the time of merging control is shorter, the speed is more suitable for merging. Therefore, the best value is set to 148 m, and the worst value is set to 195 m. In short, when the preparatory speed is set to Va1 [km/h], the distance necessary for the speed adjustment at the time of merging control is selected in the range of 148 m to 195 m, and a stochastically highest distance is 175 m.

Similarly, in the probability distribution graph, when the preparatory speed is Va2 [km/h], the distance necessary for speed adjustment at the time of merging control is in the range of 125 m to 195 m with a median being 160 m. In the probability distribution graph, when the preparatory speed is Va3 [km/h], the distance necessary for speed adjustment at the time of merging control is in the range of 100 m to 180 m with a median being 148 m. In the probability distribution graph, when the preparatory speed is Va4 [km/h], the distance necessary for speed adjustment at the time of merging control is in the range of 75 m to 181 m with a median being 140 m. In the probability distribution graph, when the preparatory speed is Va5 [km/h], the distance necessary for speed adjustment at the time of merging control is in the range of 45 m to 200 m with a median being 138 m. In the probability distribution graph, when the preparatory speed is Va6 [km/h], the probability of the distance necessary for speed adjustment at the time of merging control is in the range of 10 m to 225 m with a median being 150 m. In the probability distribution graph, when the preparatory speed is Va7 [km/h], the distance necessary for speed adjustment at the time of merging control is in the range of 70 m to 255 m with a median being 190 m. In the probability distribution graph, when the preparatory speed is Va8 [km/h], the probability of the distance necessary for speed adjustment at the time of merging control is in the range of 175 m to 345 m with a median being 265 m.

The determination unit 12 adopts the smallest median, out of the medians in the respective preparatory speeds stated above, as the preparatory speed. In the example shown in FIG. 5, when the preparatory speed is Va5 [km/h], the smallest median (star mark in the drawing) is provided. Accordingly, the determination unit 12 determines Va5 [km/h] as the preparatory speed. The determination unit 12 may generate an approximated curve extending through the medians in the respective preparatory speeds, and adopt a minimum value in the approximated curve as the preparatory speed.

Figure 6:
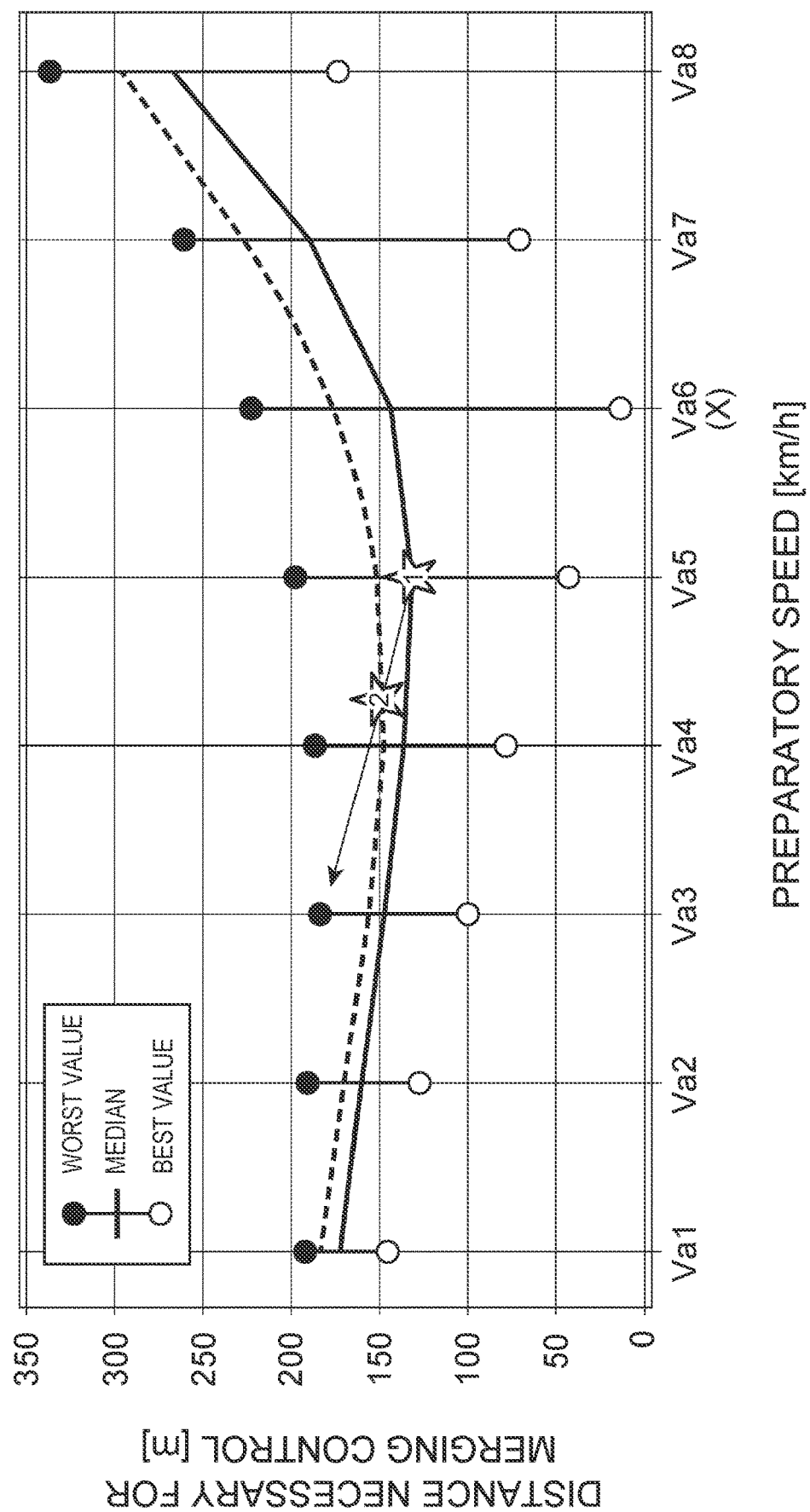
FIG. 6 is a graph showing an example of the relationship between the distance and the preparatory speed necessary for merging control.

The determination unit 12 may determine the preparatory speed based on a relative speed between the first main lane vehicle 40 and the vehicle 2, and on an inter-vehicle distance (for example, P1 of FIG. 2) between he first main lane vehicle 40 and the main lane vehicle 30 in the periphery of the first main lane vehicle 40. FIG. 6 is a graph showing an example of the relationship between the distance necessary for merging control and the preparatory speed in the scene where the speed of the main lane vehicle is X [km/h]. FIG. 6 is a modification of FIG. 5. The determination unit 12 acquires the inter-vehicle distance between the first main lane vehicle 40 and the main lane vehicle 30 in the periphery of the first main lane vehicle 40, based on the detection result of the front sensor 3. When the inter-vehicle distance between the first main lane vehicles 40 is short, there is a high possibility that the vehicle 2 and the main lane vehicle 30 run parallel in the second section L2. Accordingly, as shown in FIG. 6, when the length of the inter-vehicle distance is less than a predetermined distance threshold, the determination unit 12 corrects, in accordance with the length, the preparatory speed (Va5 [km/h] here) determined using the graph of FIG. 5 such that the preparatory speed approximates to a preparatory speed (Va3 [km/h] here) where the worst value is minimum (see an arrow in the drawing). As a result, the likelihood that the preparatory speed becomes suitable for merging increases. The determination unit 12 may correct the preparatory speed determined using the graph of FIG. 5 such that as the inter-vehicle distance of the first main lane vehicles 40 is shorter, the preparatory speed approximates more to the preparatory speed where the worst value is minimum. The determination unit 12 may plot values higher than the medians in the probability distribution graph (for example, values representing 80% of the respective value ranges in the probability distribution graph), prepare a graph (graph shown with a broken line) by connecting the plotted points, and may determine the speed corresponding to a minimum value of the graph as the preparatory speed (see a star mark with a numeral "2" in the drawing). The determination unit 12 may determine a value higher than the median in the probability distribution graph such that as the inter-vehicle distance of the first main lane vehicles 40 is shorter, the distance necessary for merging control approximates more to the worst value.

Figure 7:
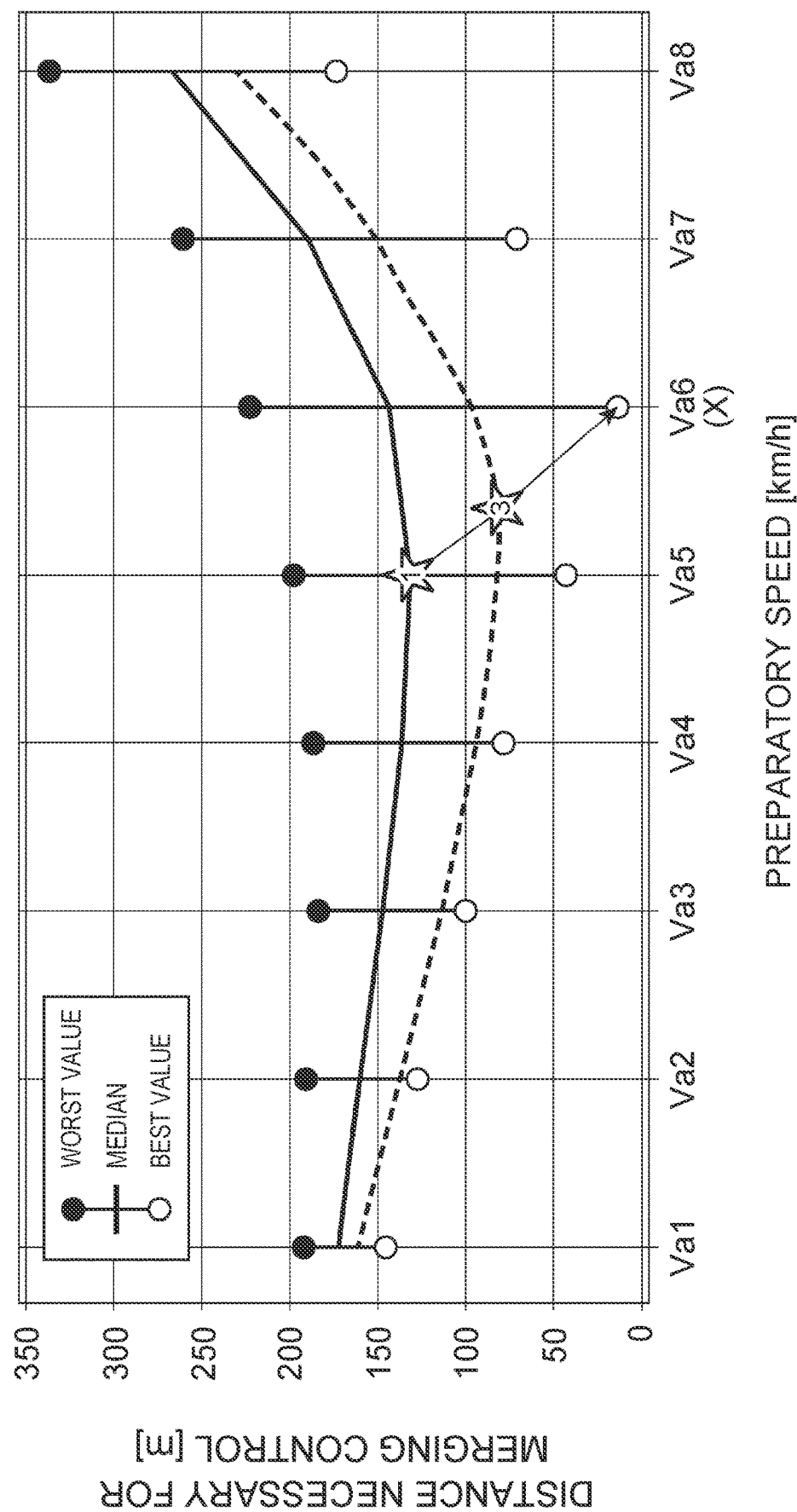
FIG. 7 is a graph showing an example of the relationship between the distance and the preparatory speed necessary for merging control.

When the inter-vehicle distance of the first main lane vehicles 40 is long, there is a low possibility that the vehicle 2 and the main lane vehicle 30 run in parallel in the second section L2. FIG. 7 is a graph showing an example of the relationship between the distance necessary for merging control and the preparatory speed in the scene where the speed of the main lane vehicles is X [km/h]. FIG. 7 is a modification of FIG. 5. As shown in FIG. 7, when the length of the inter-vehicle distance is equal to or greater than a predetermined distance threshold, the determination unit 12 corrects, in accordance with the length, the preparatory speed (Va5 [km/h] here) determined using the graph of FIG. 5 such that the preparatory speed approximates to a preparatory speed (Va6 [km/h] here) where the best value is minimum (see an arrow in the drawing). As a result, the likelihood that the preparatory speed becomes suitable for merging increases. The determination unit 12 may correct the preparatory speed determined using the graph of FIG. 5 such that as the inter-vehicle distance of the first main lane vehicles 40 is longer, the preparatory speed approximates more to the preparatory speed where the best value is minimum. The determination unit 12 may plot values lower than the medians in the probability distribution (for example, values representing 20% of the respective value ranges in the probability distribution graph), prepare a graph (graph shown with a broken line) by connecting the plotted points, and may determine the speed corresponding to a minimum value of the graph as the preparatory speed (see a star mark with a numeral "3" in the drawing). The determination unit 12 may determine a value lower than the median in the probability distribution graph such that as the inter-vehicle distance of the first main lane vehicles 40 is longer, the distance necessary for merging control approximates more to the best value.

The determination unit 12 may determine the preparatory speed based on the relative speed between the first main lane vehicle 40 and the vehicle 2, and on the density of the main lane vehicles 30. The determination unit 12 calculates the density of the main lane vehicles 30 based on the detection result of the front sensor 3. The determination unit 12 may acquire the density of the main lane vehicles 30 through communication, or may predict the density of the main lane vehicles 30 from the traffic information acquired in advance. When the density of the main lane vehicles 30 is high, i.e., when the main lane R1 is crowded, there is a high possibility that the vehicle 2 and the main lane vehicle 30 run in parallel in the second section L2. Accordingly, when the density of the main lane R1 is equal to or greater than a predetermined density, the determination unit 12 corrects, in accordance with the density, the preparatory speed (Va5 [km/h] here) determined using the graph of FIG. 5 such the preparatory speed approximates to a preparatory speed (Va3 [km/h] here) where the worst value is minimum (see an arrow in the drawing) as shown in FIG. 6. As a result, the likelihood that the preparatory speed becomes suitable for merging increases. The determination unit 12 may correct the preparatory speed determined using the graph of FIG. 5 such that as the density of the main lane vehicles 30 is higher, i.e., as the main lane R1 is crowded more, the preparatory speed approximates more to the preparatory speed where the worst value is minimum. The determination unit 12 may plot values higher than the medians in the probability distribution graph (for example, values representing 80% of the respective value ranges in the probability distribution graph), prepare a graph (graph shown with a broken line) by connecting the plotted points, and may determine the speed corresponding to a minimum value of the graph as the preparatory speed (see a star mark with a numeral "2" in the drawing). The determination unit 12 may determine a value higher than the median in the probability distribution graph such that as the density of the main lane vehicles 30 is higher, i.e., as the main lane R1 is crowded more, the distance necessary for merging control approximates more to the worst value.

When the density of the main lane vehicles 30 is low, there is a low possibility that the vehicle 2 and the main lane vehicle 30 run in parallel in the second section L2. As shown in FIG. 7, when the density of the main lane vehicles 30 is less than a predetermined density, the determination unit 12 corrects, in accordance with the density, the preparatory speed (Va5 [km/h] here) determined using the graph of FIG. 5 such that the preparatory speed approximates to a preparatory speed (Va6 [km/h] here) where the best value is minimum (see an arrow in the drawing). As a result, the likelihood that the preparatory speed becomes suitable for merging increases. The determination unit 12 may correct the preparatory speed determined using the graph of FIG. 5 such that as the density of the main lane vehicles 30 is lower, the preparatory speed approximates more to the preparatory speed where the best value is minimum. The determination unit 12 may plot values lower than the medians in the probability distribution graph (for example, values representing 20% of the respective value ranges in the probability distribution graph), prepare a graph (graph shown with a broken line) by connecting the plotted points, and may determine the speed corresponding to a minimum value of the graph as the preparatory speed (see a star mark with a numeral "3" in the drawing). The determination unit 12 may determine a value lower than the median in the probability distribution graph such that as the density of the main lane vehicles 30 is lower, the distance approximates more to the best value.

The determination unit 12 may determine the preparatory speed in consideration of both the inter-vehicle distance between the first main lane vehicle 40 and the main lane vehicle 30 in the periphery of the first main lane vehicle 40, and on the density of the main lane vehicles 30.

With reference again to FIG. 1, the preparation unit 18 adjusts the speed of the vehicle 2 such that the speed of the vehicle 2 coincides with the preparatory speed. The preparation unit 18 operates the actuator 6 to perform speed adjustment. Thus, the vehicle 2 travels in the first section L1 at the preparatory speed (see FIGS. 2 and 3).

The merging control unit 20 merges the vehicle 2 into the main lane R1 from the merging lane R2, when the situation determination unit 10 determines that the main lane vehicle 30 is recognizable based on the detection result of the side sensor 4 after the preparation unit 18 starts speed adjustment of the vehicle 2. Such a situation corresponds to the merging scene in FIG. 4, for example. In the merging scene shown in FIG. 4, the merging control unit 20 merges the vehicle 2 into the main lane R1 from merging lane R2.

In the merging scene shown in FIG. 4, the main lane vehicle 30 is detectable with the side sensor 4. Hereinafter, the main lane vehicle 30 detected with the side sensor 4 is referred to as a second main lane vehicle 50. The second main lane vehicle 50 may be detectable also with the front sensor 3 after a prescribed time. In short, the first main lane vehicle 40 may be identical to the main lane vehicle 30 defined as the second main lane vehicle 50.

The merging control unit 20 merges the vehicle 2 into the main lane R1 from the merging lane R2 based on at least the detection result of the side sensor 4 and on the speed of the vehicle 2. In one example, the merging control unit 20 merges the vehicle 2 into the main lane R1 from the merging lane R2 based on at least the relative speed and relative position between the second main lane vehicle 50 traveling on the main lane R1 detected by the side sensor 4 and the vehicle 2 and on the speed of the vehicle 2. The merging control unit 20 may merge the vehicle 2 into the main lane R1 from the merging lane R2 based on the relative speed and relative position of the first main lane vehicle 40 and the second main lane vehicle 50 traveling on the main lane R1 relative to the vehicle 2, and on the speed of the vehicle 2, the first main lane vehicle 40 and the second main lane vehicle 50 being detected with the front sensor 3 and the side sensor 4. Thus, the merging control unit 20 merges the vehicle 2 into the main lane R1 so as to cut in the main lane vehicles 30 based on the positional relationship and the speed relationship between the main lane vehicles 30 and the vehicle 2 in the vicinity of the merging point.

In one example, the merging control unit 20 determines a merging position in the main lane R1 (position of P3 that is between the first main lane vehicle 40 and the second main lane vehicle 50 in FIG. 4), and adjusts the speed of the vehicle 2 such that the longitudinal position (position in a travel direction) of the vehicle 2 is besides the merging position. After the speed adjustment of the vehicle 2 is completed, the merging control unit 20 regulates steering of the vehicle 2 and merges the vehicle 2 into the main lane R1 from the merging lane R2. Thus, the merging control unit 20 performs first control that is to perform speed control to adjust the longitudinal position of the vehicle 2 to be right beside the merging position, and second control that is to perform steering to position the vehicle 2 at the merging position after the first control. Thus, the merging control unit 20 merges the vehicle 2 into the main lane R1 by gradual control.

Operation of Vehicle Controller

Figure 8:
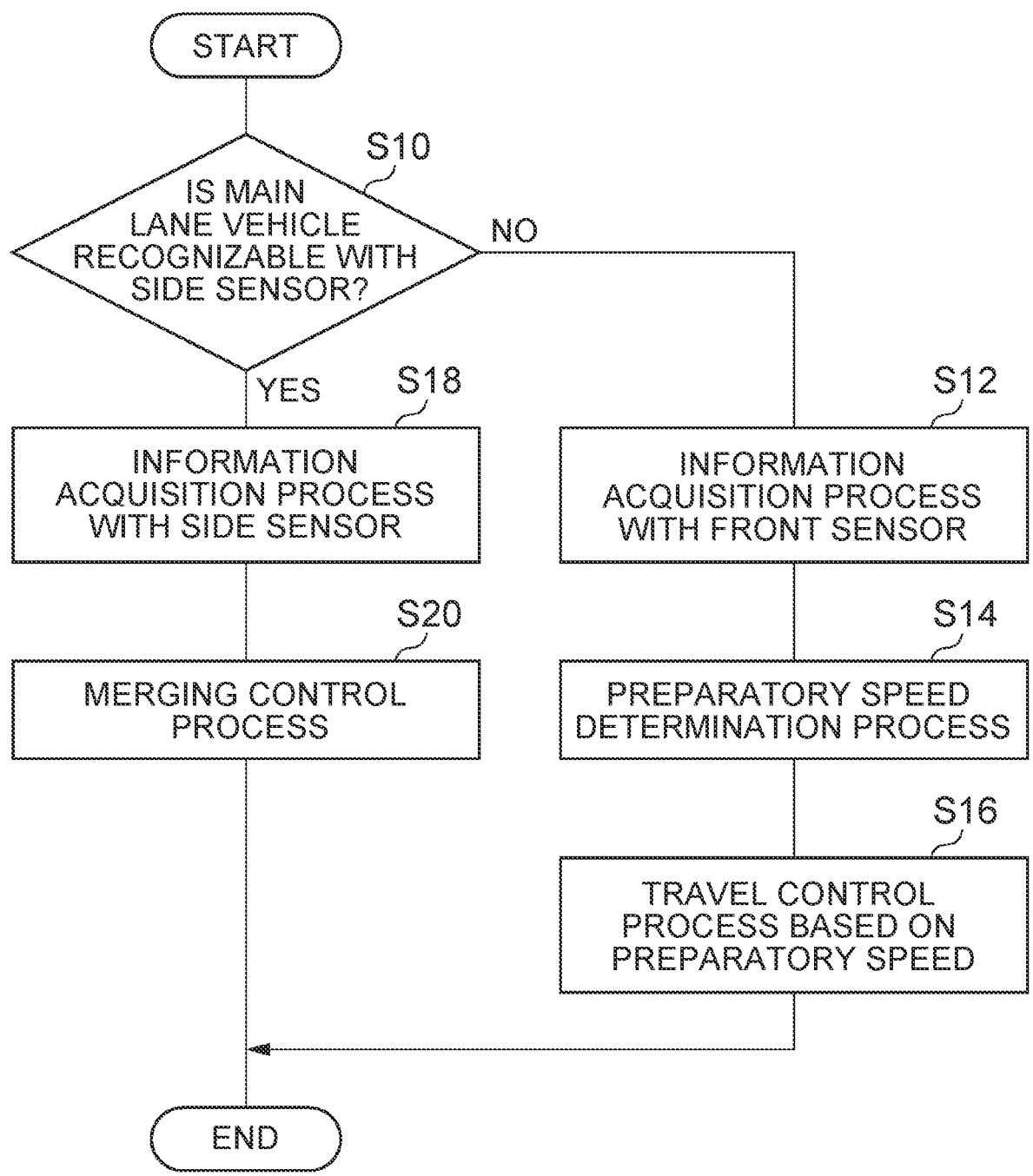
FIG. 8 is a flowchart showing an example of operation of the vehicle controller.

FIG. 8 is a flowchart showing an example of the operation of the vehicle controller. The vehicle controller 1 executes the flowchart shown in FIG. 8 while the vehicle 2 travels. Hereinafter, as shown in FIG. 2, the flowchart shown in FIG. 8 is executed when the vehicle 2 travels toward a merging point. Such a merging scene may be determined based on the position of the vehicle 2, the detection results of the front sensor 3 and the side sensor 4, or the like. The merging scene may also be determined by an external device through communication, or may be determined based on the position of the vehicle 2 and map information.

First, as a determination process (S10), the situation determination unit 10 of the vehicle controller 1 determines whether the main lane vehicle 30 is recognizable with the side sensor 4. In the merging scene shown in FIG. 2, the situation determination unit 10 determines that any main lane vehicle 30 is not recognizable with the side sensor 4 (S10: NO). In this case, the vehicle controller 1 acquires the detection result of the front sensor 3, i.e., the information on the first main lane vehicle 40, as an information acquisition process (S12). The determination unit 12 of the vehicle controller 1 then determines the preparatory speed based on the information on the first main lane vehicle 40 as a determination processing (S14). Then, the preparation unit 18 of the vehicle controller 1 controls the vehicle 2 as a travel control process (S16) so as to have the preparatory speed determined in the determination processing (S14) (FIGS. 2 and 3). Once the travel control process (S16) is ended, the flowchart shown in FIG. 8 is ended, and is executed again from the beginning. Thus, preparatory speed adjustment is performed until the main lane vehicle 30 become recognizable with the side sensor 4 in the determination process (S10) (until the merging scene shown in FIG. 3 shifts to the merging scene shown in FIG. 4).

For example, when the merging scene shown in FIG. 4 appears, the situation determination unit 10 determines that the main lane vehicle 30 is recognizable with the side sensor 4 (S10: YES). In this case, the vehicle controller 1 acquires the detection result of the side sensor 4, i.e., the information on the second main lane vehicle 50, as the information acquisition process (S18). Next, the merging control unit 20 of the vehicle controller 1 merges the vehicle 2 into the main lane R1 as a merging control process (S20) based on at least the detection result of the side sensor 4. Once the merging control process (S20) is ended, the flowchart shown in FIG. 8 is ended and is executed again from the beginning. The flowchart shown in FIG. 8 is not repeatedly executed when an end condition is satisfied. The end condition is satisfied when the merging control is ended or when a termination operation by a driver is received.

SUMMARY OF FIRST EMBODIMENT

When any main lane vehicle 30 is not recognizable based on the detection result of the side sensor 4, the vehicle controller 1 determines the preparatory speed of the vehicle 2 in the merging lane R2 based on a relative speed between the first main lane vehicle 40 traveling on the main lane R1*i* and the vehicle 2, the first main lane vehicle 40 being detected by the front sensor 3. The speed of the vehicle 2 traveling on the merging lane R2 is adjusted to be the preparatory speed. When the main lane vehicle 30 is recognizable based on the detection result of the side sensor 4 after the start of speed adjustment, the vehicle 2 merges into the main lane R1 based on at least the detection result of the side sensor 4. Thus, when the main lane vehicle 30 is not recognizable based on the detection result of the side sensor 4, as in the case where the wall W that disturbs the detection function of the side sensor 4 is present between the merging lane R2 and the main lane R1 (FIG. 2), the vehicle controller 1 can adjust the speed of the vehicle 2 based on the relative speed with the first main lane vehicle 40 even before the detection function of the side sensor 4 becomes effective. Therefore, the vehicle controller 1 can perform an appropriate preparation for merging.

The vehicle controller 1 performs gradual merging control where the speed is adjusted and then steering is performed. Accordingly, since the speed of the vehicle 2 is adjusted to be the preparatory speed before merging control, the speed of the vehicle 2 can be adjusted such that the longitudinal position of the vehicle 2 is right beside the merging position in a short time. As a result, the distance necessary for the speed adjustment at the time of merging control is shortened, and merging can be performed easily. Therefore, the merging success rate is increased.

Since the vehicle controller 1 determines the preparatory speed in consideration of the inter-vehicle distance on the main lane R1, the probability that the speed of the vehicle 2 is suitable for merging can be increased. Since the vehicle controller 1 determines the preparatory speed in consideration of the vehicle density in the main lane R1, the probability that the speed of the vehicle 2 is suitable for merging can be increased.

Second Embodiment

A vehicle controller 1A according to a second embodiment is similar to the vehicle controller 1 according to the first embodiment except that the vehicle controller 1A includes an acquisition unit 14 and that the determination unit 12 uses a different method for determining the preparatory speed. In the second embodiment, the description similar to the first embodiment is not repeated.

Figure 9:
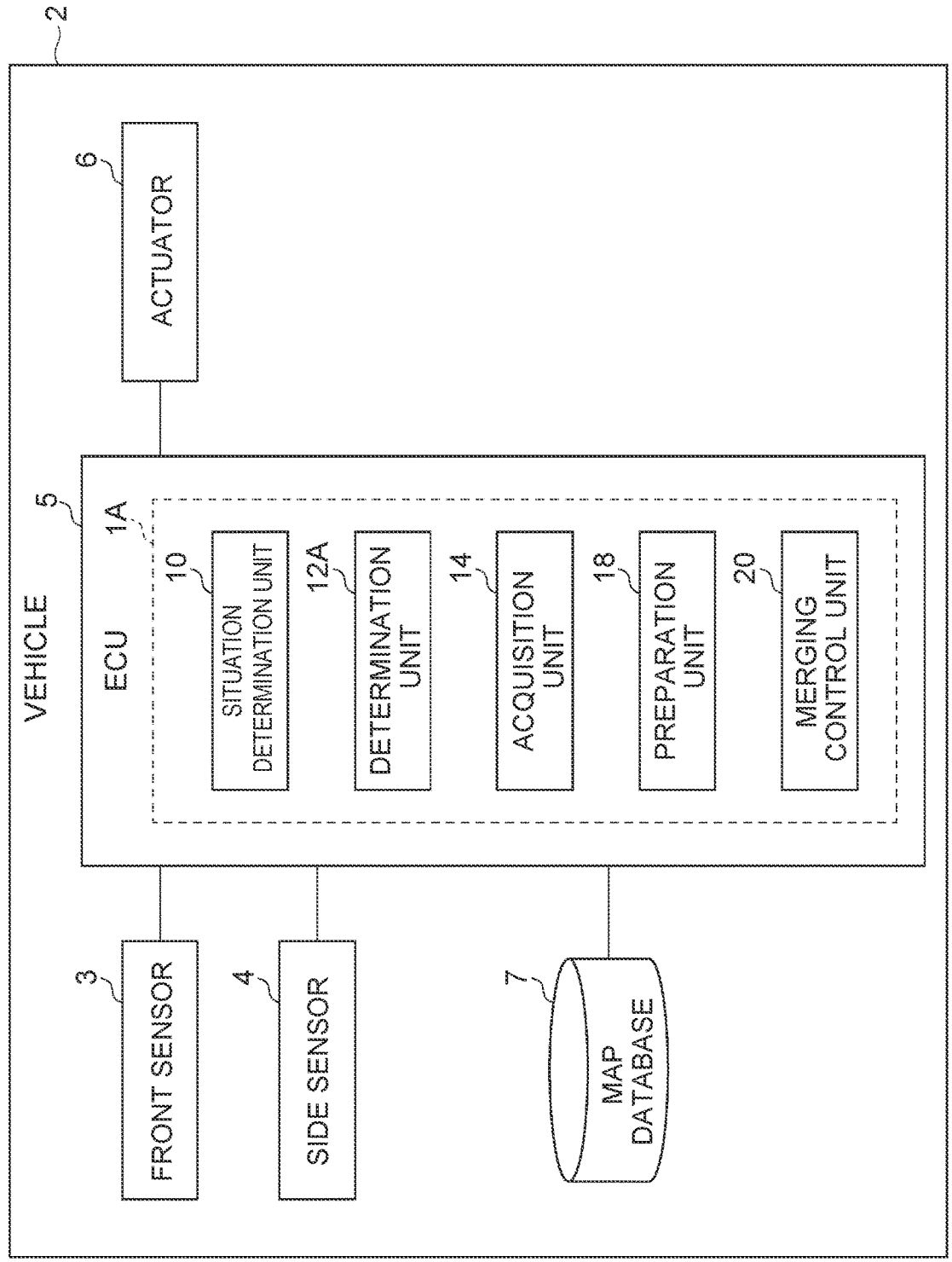
FIG. 9 is a block diagram showing an example of the vehicle including a vehicle controller according to a second embodiment.

FIG. 9 is a block diagram showing an example of a vehicle including the vehicle controller according to the second embodiment. As shown in FIG. 9, the vehicle 2 includes a map database 7. The map database 7 stores map information. The map information is the data storing location information regarding roads, road structures, buildings, and the like. The map information includes the length of the roads, and the position of merging points. The vehicle 2 may acquire the map information through communication. In that case, the vehicle 2 does not need to include the map database 7.

The ECU 5 constitutes the vehicle controller 1A. The vehicle controller 1A includes the acquisition unit 14. The acquisition unit 14 acquires the location of the vehicle 2 with an unshown GPS receiver or the like, and acquires the map information corresponding to the location of the vehicle 2 from the map database 7. The acquisition unit 14 acquires the length of the merging lane R2 based on the map information. For example, the acquisition unit 14 acquires the length of the first section L1 and the length of the second section L2 in FIG. 2.

The determination unit 12A determines the preparatory speed by the same method performed by the determination unit 12 of the first embodiment, and then changes the preparatory speed in accordance with the length of the merging lane acquired by the acquisition unit 14. For example, when the length of the merging lane R2 (the length of the first section L1+ the length of the second section L2) is shorter than a predetermined length, the determination unit 12A corrects the preparatory speed in order to lengthen the time when the vehicle 2 stays in the second section L2. The determination unit 12 may correct the preparatory speed such that as the length of the merging lane R2 is shorter, the preparatory speed is set to be lower.

The determination unit 12A may change the preparatory speed in accordance with the length of the second section L2. In that case, when the length of the second section L2 is shorter than a predetermined length, the determination unit 12A also corrects the preparatory speed to be lower. The determination unit 12 may correct the preparatory speed such that as the second section L2 is shorter, the preparatory speed is set to be lower. When the length of the first section L1 is longer than the predetermined length, the determination unit 12A can easily secure the distance that is used to reach the determined preparatory speed. Accordingly, upper and lower limit accelerations, and upper and lower limit jerks may be set to be smaller, or the timing to reach the preparatory speed may be set to the time when the first section is ended. Other configurational aspects of the vehicle controller 1A are similar to those of the vehicle controller 1.

Summary of Second Embodiment

When the length of the merging lane R2 is shorter than a predetermined length, the vehicle controller 1A changes the preparatory speed so as to lengthen the time when the vehicle 2 stays in the second section L2. This makes it possible to increase the merging success rate.

Third Embodiment

A vehicle controller 1B according to a third embodiment is similar to the vehicle controller 1 according to the first embodiment except that the vehicle controller 1_B includes a recognition unit 16 and that the determination unit 12 uses a different method for determining the preparatory speed. In the third embodiment, the description similar to the first embodiment is not repeated.

Figure 10:
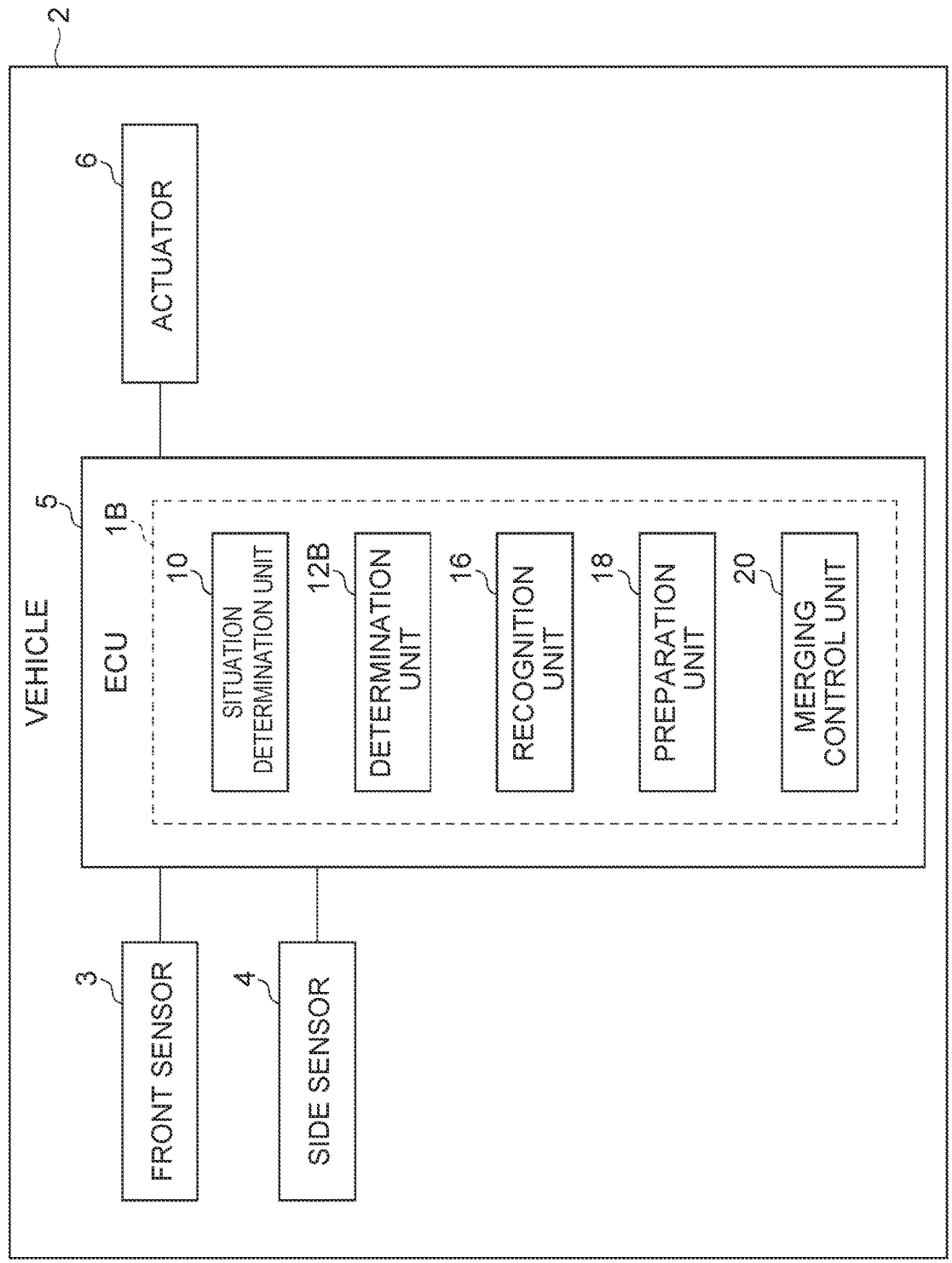
FIG. 10 is a block diagram showing an example of the vehicle including a vehicle controller according to a third embodiment.
Figure 11:
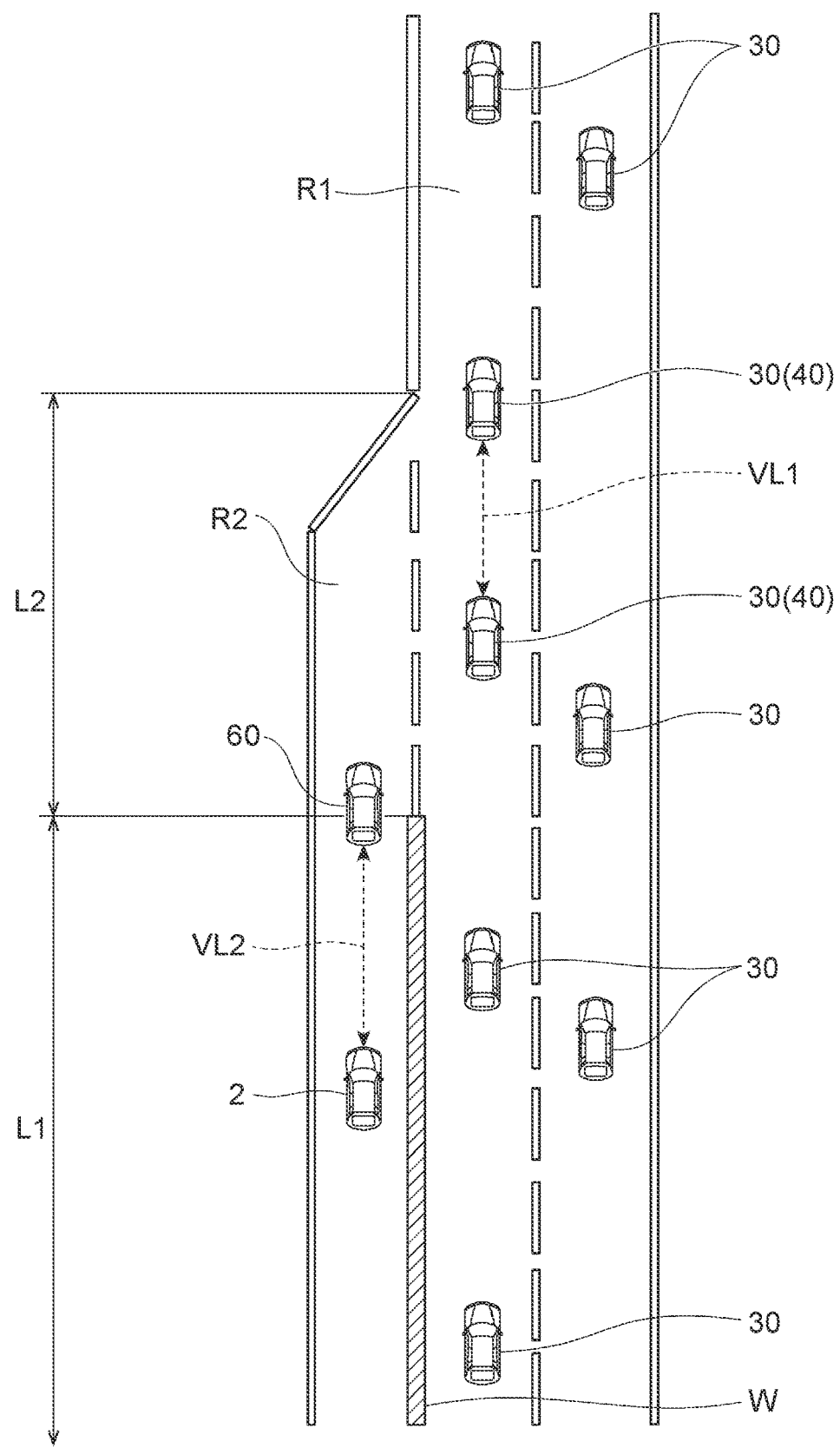
FIG. 11 shows an example of a merging scene where a preceding vehicle is present.

FIG. 10 is a block diagram showing an example of a vehicle including the vehicle controller according to the third embodiment. As shown in FIG. 10, the ECU 5 constitutes the vehicle controller 1B. The vehicle controller 1B includes the recognition unit 16. The recognition unit 16 recognizes a preceding vehicle traveling on the merging lane R2. FIG. 11 shows an example of a merging scene where a preceding vehicle is present. As shown in FIG. 11, on the merging lane R2, a preceding vehicle 60 travels in front of the vehicle 2. The recognition unit 16 recognizes the preceding vehicle 60 based on the detection result of the front sensor 3.

When the preceding vehicle 60 is not present, the determination unit 12B determines the preparatory speed by the same method performed by the determination unit 12 of the first embodiment. When the recognition unit 16 recognizes the preceding vehicle 60, the determination unit 12B acquires an inter-vehicle distance VL2 between the preceding vehicle 60 and the vehicle 2, and an inter-vehicle distance VL1 between the first main lane vehicle 40 and the main lane vehicle 30 in the periphery of the first main lane vehicle 40 detected with the front sensor 3. The determination unit 12B then determines the preparatory speed such that the inter-vehicle distance VL2 coincides with the inter-vehicle distance VL1. Since the preceding vehicle 60 merges in between the main lane vehicles 30, the vehicle 2 is controlled such that the inter-vehicle distance VL2 coincides with the inter-vehicle distance VL1. This makes it possible to increase the possibility that the main lane vehicle 30, the preceding vehicle 60, the main lane vehicle 30, and the vehicle are positioned in a row in this order. In short, the inter-vehicle distance control can reduce the probability that the vehicle 2 runs parallel to the main lane vehicle 30.

Summary of Third Embodiment

Since the vehicle controller 1B can coincide the inter-vehicle distance in the main lane R1 with the inter-vehicle distance in the merging lane R2, the merging success rate can be increased.

The embodiments disclosed may be carried out in various aspects to which various arrangements and modifications are applied based on the knowledge of those skilled in the art. The respective embodiments may be combined and implemented.

For example, in the third embodiment, when the preceding vehicle 60 is not present, the preparatory speed is determined by the same method performed by the determination unit 12 of the first embodiment. However, when the preceding vehicle 60 is present, the preparatory speed may be determined by the same method performed by the determination unit 12 of the first embodiment. In that case, when the recognition unit 16 recognizes the preceding vehicle 60, the preparation unit 18 may control travel of the vehicle 2 so as to secure a prescribed inter-vehicle distance or more, and then control the travel of the vehicle such that the speed of the vehicle 2 coincides with the preparatory speed. With this configuration, before the speed of the vehicle 2 is adjusted to be the preparatory speed, the 10 distance between the vehicle 2 and the preceding vehicle 60 becomes the prescribed inter-vehicle distance or more. As a result, it becomes possible to increase the probability that the speed of the vehicle 2 is adjusted to be the preparatory speed without causing a contact with the preceding vehicle 60.

What is claimed is:

1. A vehicle controller configured to control travel of a vehicle traveling on a merging lane that merges with a main lane, the vehicle controller comprising:
   a situation determination unit configured to determine whether the vehicle is in a situation where a main lane vehicle traveling on the main lane is recognizable based on a detection result of a side sensor mounted on the vehicle;
   a determination unit configured to determine a preparatory speed of the vehicle in the merging lane, when the situation determination unit determines that the vehicle is not in the situation where the main lane vehicle is recognizable based on the detection result of the side sensor, based on a relative speed between a first main lane vehicle traveling on the main lane and the vehicle, the first main lane vehicle being detected by a front sensor mounted on the vehicle;
   a preparation unit configured to adjust speed of the vehicle such that the speed of the vehicle coincides with the preparatory speed; and
   a merging control unit configured to merge the vehicle into the main lane from the merging lane based on at least the detection result of the side sensor and the speed of the vehicle, when the situation determination unit determines that the vehicle is in the situation where the main lane vehicle is recognizable based on the detection result of the side sensor, after the preparation unit starts speed adjustment of the vehicle.

2. The vehicle controller according to claim 1, wherein the merging control unit is configured to merge the vehicle into the main lane from the merging lane based on the speed of the vehicle and on a relative speed and a relative position between a second main lane vehicle traveling on the main lane and the vehicle and, the second main lane vehicle being detected by the side sensor.

3. The vehicle controller according to claim 1, wherein the merging control unit is configured to:
   determine a merging position in the main lane;
   adjust the speed of the vehicle such that a longitudinal position of the vehicle is beside the merging position, the longitudinal position being a position in an extending direction of the main lane; and
   merge the vehicle into the main lane from the merging lane by regulating steering of the vehicle after adjustment of the speed of the vehicle is completed.

4. The vehicle controller according to claim 1, wherein the determination unit is configured to determine the preparatory speed based on the relative speed between the first main lane vehicle and the vehicle and on an inter-vehicle distance between the first main lane vehicle and the main lane vehicle in a periphery of the first main lane vehicle.

5. The vehicle controller according to claim 1, wherein the determination unit is configured to determine the preparatory speed based on the relative speed between the first main lane vehicle and the vehicle and on a density of a plurality of the main lane vehicles.

6. The vehicle controller according to claim 1, further comprising an acquisition unit configured to acquire a length of the merging lane based on map information, wherein
   the determination unit is configured to determine the preparatory speed in accordance with the length of the merging lane acquired by the acquisition unit.

7. The vehicle controller according to claim 1, further comprising a recognition unit configured to recognize a preceding vehicle traveling on the merging lane, wherein
   the determination unit is configured to, when the recognition unit recognizes the preceding vehicle, determine the preparatory speed such that an inter-vehicle distance between the preceding vehicle and the vehicle coincides with the inter-vehicle distance between the first main lane vehicle and the main lane vehicle in a periphery of the first main lane vehicle detected by the front sensor.

8. The vehicle controller according to claim 1, further comprising a recognition unit configured to recognize a preceding vehicle traveling on the merging lane, wherein
   the preparation unit is configured to, when the recognition unit recognizes the preceding vehicle, control travel of the vehicle such that an inter-vehicle distance between the vehicle and the preceding vehicle becomes a prescribed inter-vehicle distance or more, and then control travel of the vehicle such that the speed of the vehicle coincides with the preparatory speed.

9. The vehicle controller according to claim 1, wherein the preparatory speed is a speed suitable for merging of the vehicle into the main lane from the merging lane.

10. A vehicle controller configured to control travel of a vehicle traveling on a merging lane that merges with a main lane, the vehicle controller comprising:
    a situation determination unit configured to determine whether the vehicle is in a situation where a main lane vehicle traveling on the main lane is recognizable based on a detection result of a side sensor mounted on the vehicle;
    a recognition unit configured to recognize a preceding vehicle traveling on the merging lane;
    a determination unit configured to determine a preparatory speed of the vehicle in the merging lane based on a relative speed between a first main lane vehicle traveling on the main lane and the vehicle, the first main lane vehicle being detected by a front sensor mounted on the vehicle;

a preparation unit configured to adjust speed of the vehicle such that the speed of the vehicle coincides with the preparatory speed; and a merging control unit configured to merge the vehicle into the main lane from the merging lane based on at least the detection result of the side sensor and the speed of the vehicle, when the situation determination unit determines that the vehicle is in the situation where the main lane vehicle is recognizable based on the detection result of the side sensor, after the preparation unit starts speed adjustment of the vehicle, wherein the determination unit is configured to, when the recognition unit recognizes the preceding vehicle, determine the preparatory speed such that an inter-vehicle distance between the preceding vehicle and the vehicle coincides with the inter-vehicle distance between the first main lane vehicle and the main lane vehicle in a periphery of the first main lane vehicle detected by the front sensor.

11. The vehicle controller according to claim 10, wherein the merging control unit is configured to merge the vehicle into the main lane from the merging lane based on the speed of the vehicle and on a relative speed and a relative position between a second main lane vehicle traveling on the main lane and the vehicle and, the second main lane vehicle being detected by the side sensor.

12. The vehicle controller according to claim 10, wherein the merging control unit is configured to:

determine a merging position in the main lane;

adjust the speed of the vehicle such that a longitudinal position of the vehicle is beside the merging position, the longitudinal position being a position in an extending direction of the main lane; and merge the vehicle into the main lane from the merging lane by regulating steering of the vehicle after adjustment of the speed of the vehicle is completed.

13. The vehicle controller according to claim 10, wherein the determination unit is configured to determine the preparatory speed based on the relative speed between the first main lane vehicle and the vehicle and on an inter-vehicle distance between the first main lane vehicle and the main lane vehicle in a periphery of the first main lane vehicle.

14. The vehicle controller according to claim 10, wherein the determination unit is configured to determine the preparatory speed based on the relative speed between the first main lane vehicle and the vehicle and on a density of a plurality of the main lane vehicles.

15. The vehicle controller according to claim 10, further comprising an acquisition unit configured to acquire a length of the merging lane based on map information, wherein the determination unit is configured to determine the preparatory speed in accordance with the length of the merging lane acquired by the acquisition unit.

16. The vehicle controller according to claim 10, wherein the preparation unit is configured to, when the recognition unit recognizes the preceding vehicle, control travel of the vehicle such that the inter-vehicle distance between the vehicle and the preceding vehicle becomes a prescribed inter-vehicle distance or more, and then control travel of the vehicle such that the speed of the vehicle coincides with the preparatory speed.

17. The vehicle controller according to claim 10, wherein the preparatory speed is a speed suitable for merging of the vehicle into the main lane from the merging lane.

* * * * *